(12) United States Patent
Aga et al.

(10) Patent No.: US 11,640,444 B2
(45) Date of Patent: *May 2, 2023

(54) DEVICE AND METHOD FOR ACCELERATING MATRIX MULTIPLY OPERATIONS

(71) Applicant: Advanced Micro Devices, Inc., Santa Clara, CA (US)

(72) Inventors: Shaizeen Aga, Santa Clara, CA (US); Nuwan Jayasena, Santa Clara, CA (US); Allen H. Rush, Santa Clara, CA (US); Michael Ignatowski, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/208,526

(22) Filed: Mar. 22, 2021

(65) Prior Publication Data

US 2021/0209192 A1 Jul. 8, 2021

Related U.S. Application Data

(63) Continuation of application No. 16/176,662, filed on Oct. 31, 2018, now Pat. No. 10,956,536.

(51) Int. Cl.
*G06F 17/16* (2006.01)
*G06F 7/53* (2006.01)
*G06F 15/80* (2006.01)

(52) U.S. Cl.
CPC ............ *G06F 17/16* (2013.01); *G06F 7/5324* (2013.01); *G06F 15/8007* (2013.01)

(58) Field of Classification Search
CPC .................. G06F 17/16; G06F 15/163; G06F 15/173–17387; G06F 15/80;
(Continued)

(56) References Cited

U.S. PATENT DOCUMENTS 6,167,502 A 12/2000 Pechanek et al.
2018/0189237 A1 7/2018 Werner et al.
(Continued)

OTHER PUBLICATIONS

Cannon, L., "A cellular computer to implement the kalman filter algorithm", Doctoral Dissertation, Montana State University, Bozeman, MT. USA, 229 pgs., 1969.
(Continued)

*Primary Examiner* — Emily E Larocque
(74) *Attorney, Agent, or Firm* — Volpe Koenig

(57) ABSTRACT

A processing device is provided which comprises memory configured to store data and a plurality of processor cores in communication with each other via first and second hierarchical communication links. Processor cores of a first hierarchical processor core group are in communication with each other via the first hierarchical communication links and are configured to store, in the memory, a sub-portion of data of a first matrix and a sub-portion of data of a second matrix. The processor cores are also configured to determine a product of the sub-portion of data of the first matrix and the sub-portion of data of the second matrix, receive, from another processor core, another sub-portion of data of the second matrix and determine a product of the sub-portion of data of the first matrix and the other sub-portion of data of the second matrix.

20 Claims, 6 Drawing Sheets

(58) Field of Classification Search
CPC ............. G06F 15/8023; G06F 15/8043; G06F 15/8046; G06F 15/803; G06F 15/8053–8069
See application file for complete search history.

(56) References Cited

U.S. PATENT DOCUMENTS

2019/0243653 A1  8/2019  Sodani et al.
2020/0081744 A1  3/2020  Siegl et al.

OTHER PUBLICATIONS

Fox, G. C. et al., "Matrix algorithms on a hypercube i: Matrix multiplication," Parallel Computing, vol. 4, pp. 17-31, Elsevier Science Publishers B.V., Feb. 1987.
Van De Geun, R. et al., "Summa: Scalable Universal Matrix Multiplication Algorithm" Technical Report, University of Texas at Austin, Austin, TX, USA, 19 pgs., 1995.
Chen, "Using Dataflow to Optimize Energy Efficiency of Deep Neural Network Accelerators," IEEE Computer Society, May/Jun. 2017.

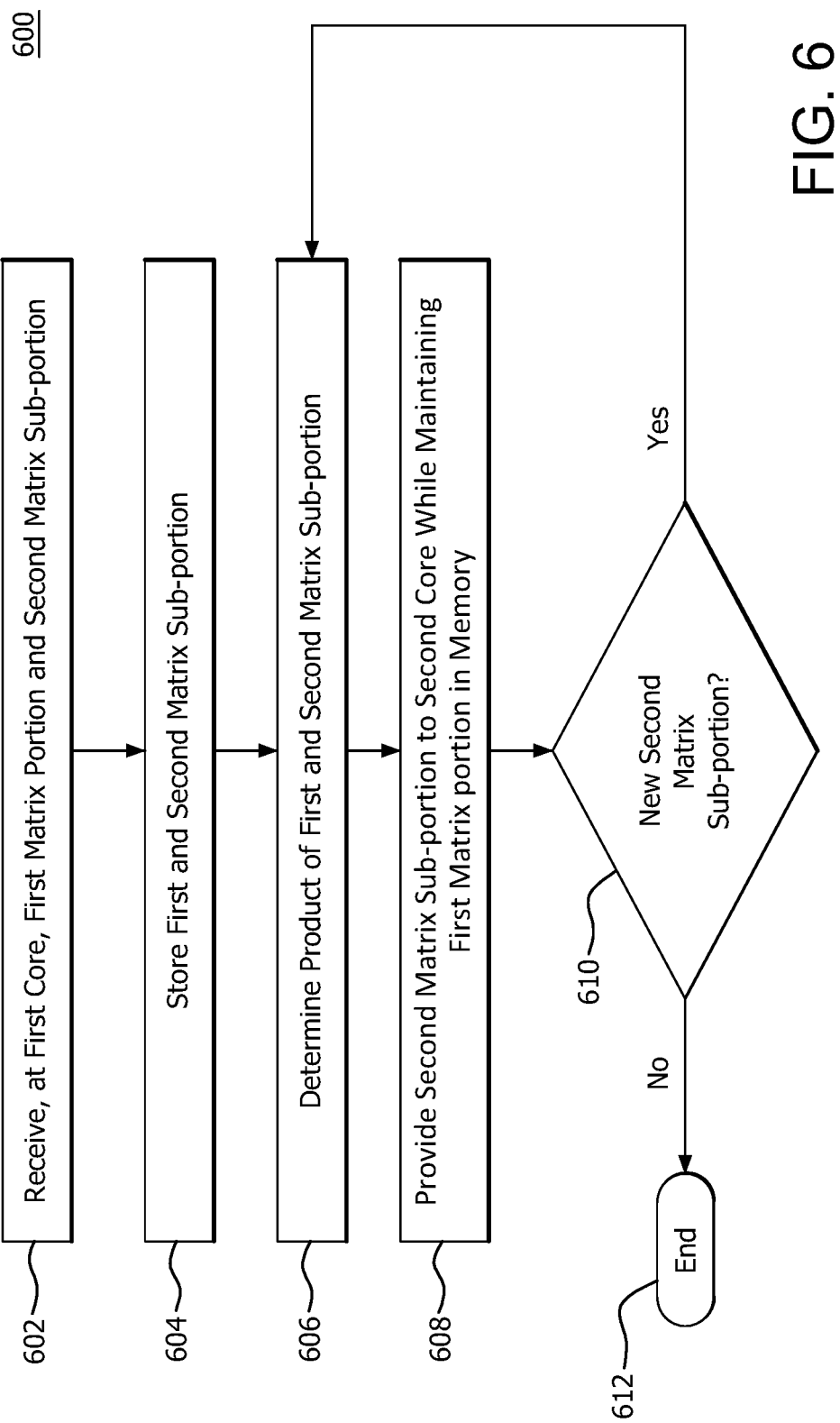

DEVICE AND METHOD FOR ACCELERATING MATRIX MULTIPLY OPERATIONS

CROSS REFERENCE TO RELATED APPLICATION

This application is a continuation of U.S. patent application Ser. No. 16/176,662, filed Oct. 31, 2018, which is incorporated by reference as if fully set forth.

BACKGROUND

Matrix multiplication is a key building block across a number of application domains, including use in high performance computing (HPC) and machine learning. Matrix multiplication is also used in convolutional neural networks, recurrent neural networks and other forms of artificial neural networks.

Conventional matrix multiplication techniques employ parallelization to increase the efficiency of matrix multiplication. For example, two matrices are typically divided into smaller portions (e.g., columns, rows, and portions of columns and rows) and a matrix multiplication operation of the two matrices is performed by executing a plurality of matrix multiplication computations each including the multiplication of a portion of one matrix with a portion of another matrix. The matrix multiplication computations are mapped to and executed by different processor cores of a processor network to perform the matrix multiplication operation.

BRIEF DESCRIPTION OF THE DRAWINGS

A more detailed understanding can be had from the following description, given by way of example in conjunction with the accompanying drawings wherein:

FIG. 6 is a flow diagram illustrating an exemplary matrix multiplication method according to features of the disclosure.

DETAILED DESCRIPTION

Figure 1:
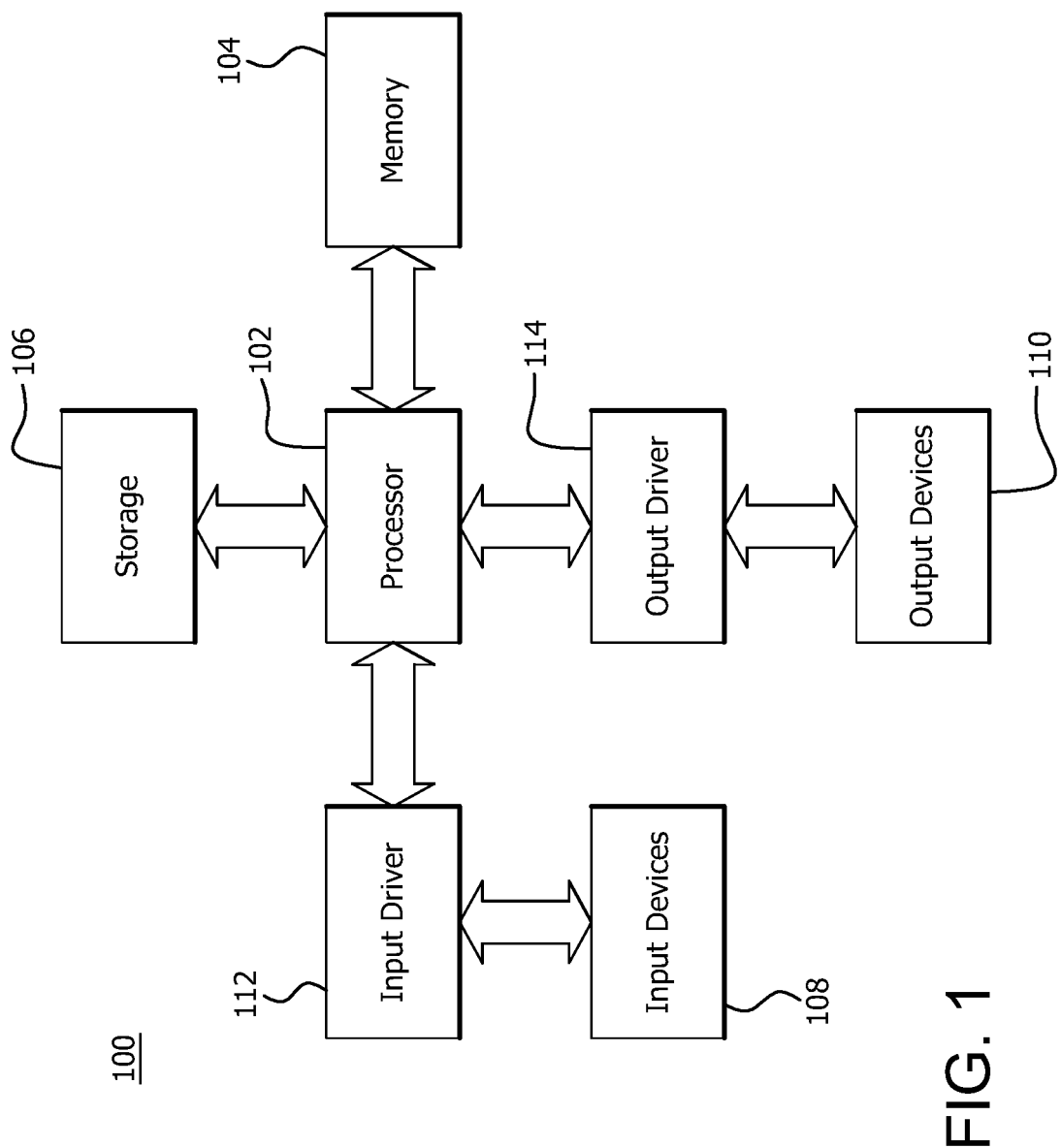
FIG. 1 is a block diagram of an example device in which one or more features of the disclosure can be implemented.

As used herein, programs include sequences of instructions to be executed using one or more processors to perform procedures or routines (e.g., operations, computations, functions, processes, jobs). Processing of programmed instructions and data includes one or more of a plurality of processing stages, such as but not limited to fetching, decoding, scheduling for execution, executing and decoding the programmed instructions and data. Programmed instructions include, for example, applications and control programs, such as operating systems.

Processors include, for example, multiple processing cores (e.g., compute units (CUs)) each of which are configured to read and execute program instructions, such as instructions to perform matrix multiplications.

For simplification purposes, "store" is used herein to refer to reading or loading data from main memory into registers or other available local storage as well as writing data from registers or other available local storage to main memory. "Communicate" is used herein to refer to sending data between CUs without main memory accesses (e.g., storing data from registers or local storage of one processor to registers or local storage of another processor).

Conventional techniques used to perform matrix multiplications are ill-suited for hierarchical networks (e.g., CU networks). For example, conventional matrix multiplication techniques exhibit load imbalance, causing some CUs to stall other CUs in the hierarchical network. In addition, these conventional techniques inefficiently use the underlying hierarchical CU networks to perform matrix multiplication operations.

The present application provides apparatuses and methods of mapping matrix multiplication computations to a hierarchical CU network. The apparatuses and methods described herein exploit characteristics of the hierarchical CU networks, such as physical proximity between CUs in CU groups of the networks and asymmetric communication links in the networks, to execute matrix multiplications more efficiently than conventional matrix multiplication techniques, resulting in a decreased load imbalance among CUs in the hierarchical network and a reduced amount of data communicated between CUs in the hierarchical network. Features of the present disclosure localize communication using links between CUs which are physically closer to each other than other CUs in the hierarchical network. These communication links are, for example, configured to be physically wider and transmit data faster between the more closely located CUs than other communication links between CUs which are more distant from each other.

A processing device is provided which comprises memory configured to store data and a plurality of processor cores in communication with each other via first and second hierarchical communication links. Processor cores of a first hierarchical processor core group are in communication with each other via the first hierarchical communication links and are configured to store, in the memory, a sub-portion of data of a first matrix and a sub-portion of data of a second matrix. The processor cores are also configured to determine a product of the sub-portion of data of the first matrix and the sub-portion of data of the second matrix, receive, from another processor core, another sub-portion of data of the second matrix and determine a product of the sub-portion of data of the first matrix and the other sub-portion of data of the second matrix.

A processing device is provided which comprises memory configured to store data and a plurality of processor cores in communication with each other via first hierarchical communication links. The processor cores comprise a first processor core and a second processor core. The first processor core is configured to determine a product of a first sub-portion of data of a first matrix received from the memory and a first sub-portion of data of a second matrix received from the memory and communicate, to the second processor core via one of the first hierarchical communication links, the first sub-portion of data of the second matrix. The second processor core is configured to receive the first sub-portion of data of the second matrix communicated by the first processor without accessing the memory and determine a product of the first sub-portion of data of the second matrix received from the first processor and a second sub-portion of data of the first matrix received from the memory.

A method for use in a processing device having a plurality of processor cores for performing matrix multiplication is provided. The method comprises receiving, from memory by a first processor core, a first sub-portion of data of a first matrix and receiving, from the memory by the first processor core, a first sub-portion of data of a second matrix. The method also comprises determining, by the first processor core, a product of the first sub-portion of data of the first matrix and the first sub-portion of data of the second matrix and communicating, by the first processor core to a second processor core, the first sub-portion of data of the second matrix via one of a plurality of first hierarchical communication links. The method further comprises receiving, from the memory by the second processor core, a second sub-portion of data of the first matrix and determining, by the second processor core, a product of the second sub-portion of data of the first matrix and the first sub-portion of data of the second matrix.

FIG. 1 is a block diagram of an example device 100 in which one or more features of the disclosure can be implemented. The device 100 includes, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 also optionally includes an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), including dynamic RAM (DRAM) and static RAM (SRAM). The RAM includes for example, cache memory, scratchpad memory and registers.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Features of the present disclosure are described herein using CUs as an example of processor cores. CUs include one or more single instruction, multiple data (SIMD) units that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit includes sixteen lanes, where each lane executes the same instruction at the same time as the other lanes in a SIMD unit but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow. The parallelism afforded by CUs is suitable for matrix multiplication, such as for example, matrix multiplication used in graphics related operations such as pixel value calculations, vertex transformations, and other graphics operations.

Figure 2:
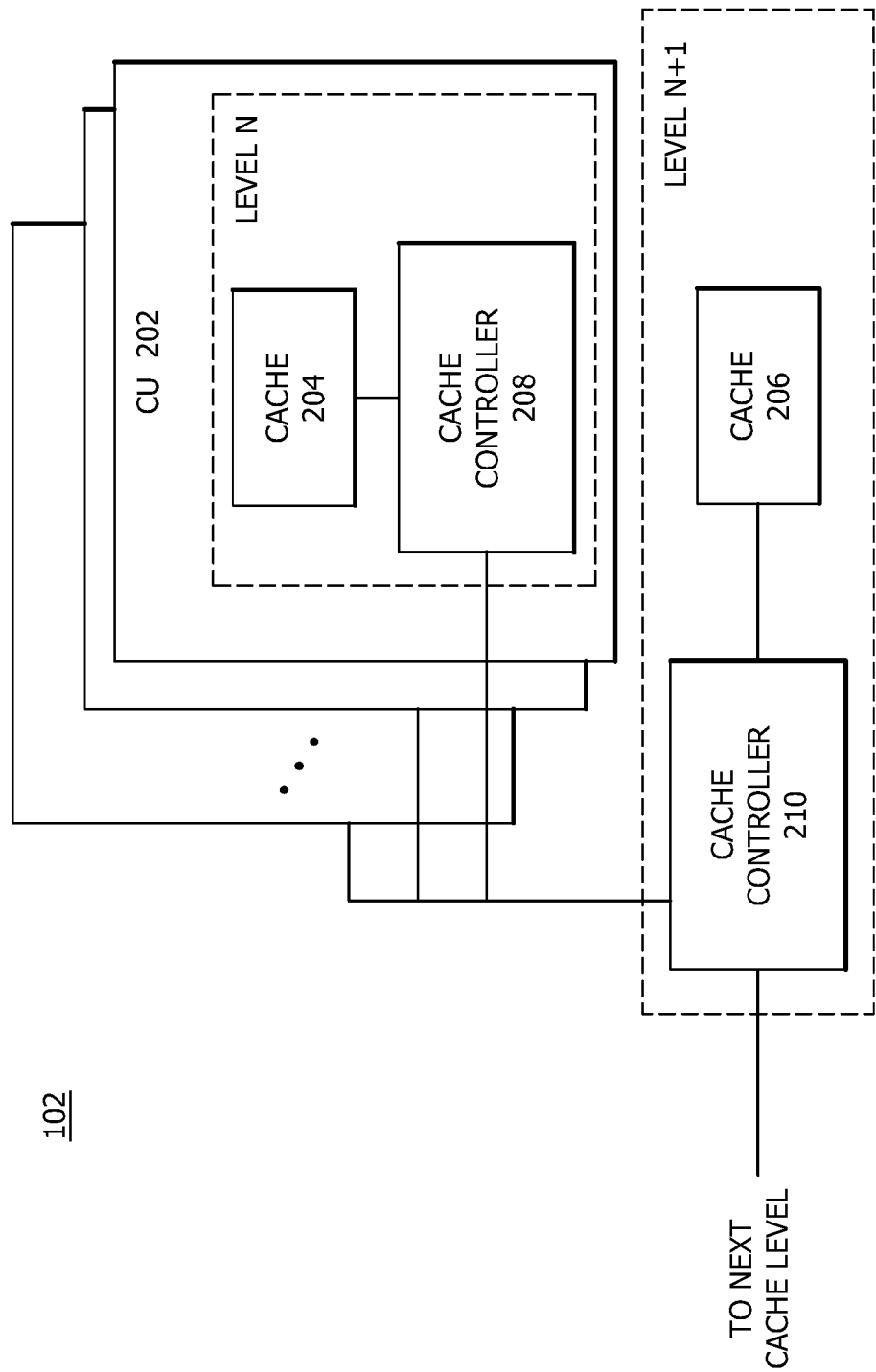
FIG. 2 is a block diagram illustrating exemplary components of a processor in which one or more features of the disclosure can be implemented.

FIG. 2 is a block diagram illustrating an example of processor 102 shown in FIG. 1 in which one or more features of the disclosure can be implemented. As shown in FIG. 2, processor 102 includes a plurality of CUs 202. Each CU 202 includes a level N (e.g., level 1) cache controller 208 in communication with a corresponding level N cache 204 and is configured to process data using the corresponding level N cache 204. Alternatively, a plurality of level N cache controllers 208 (e.g., a cache controller 208 for each CU 202 or a plurality of cache controllers 208 each in communication with a group of CUs 202) is used to process data.

As shown in FIG. 2, processor 102 also includes a level N+1 (e.g., level 2) cache controller 210 in communication with level N+1 cache 206 and is configured to process data using a level N+1 cache 206. Alternatively, a plurality of level N+1 cache controllers, in communication with one or more corresponding level N+1 caches, is used to process data. As shown in FIG. 2, cache controller 210 is also in communication with a next cache level (e.g., level 3) and each level N cache controller 208. Additionally or alternatively, each CU 202 is in communication with different types of memory 104, such as registers and scratchpad memory.

Matrix multiplication includes mapping elements of matrices (i.e., data in rows and columns of the matrices) to a network of communicating CUs. Some matrices (e.g., machine learning matrices) often result in being memory (e.g., cache memory) bound. In addition, bottlenecks often occur during matrix multiplication (e.g., machine learning matrix multiplication) when small matrices (i.e., small number of elements) or irregular matrices (e.g., uneven number of rows and columns) result in an insufficient amount of work per CU 302.

Figure 3:
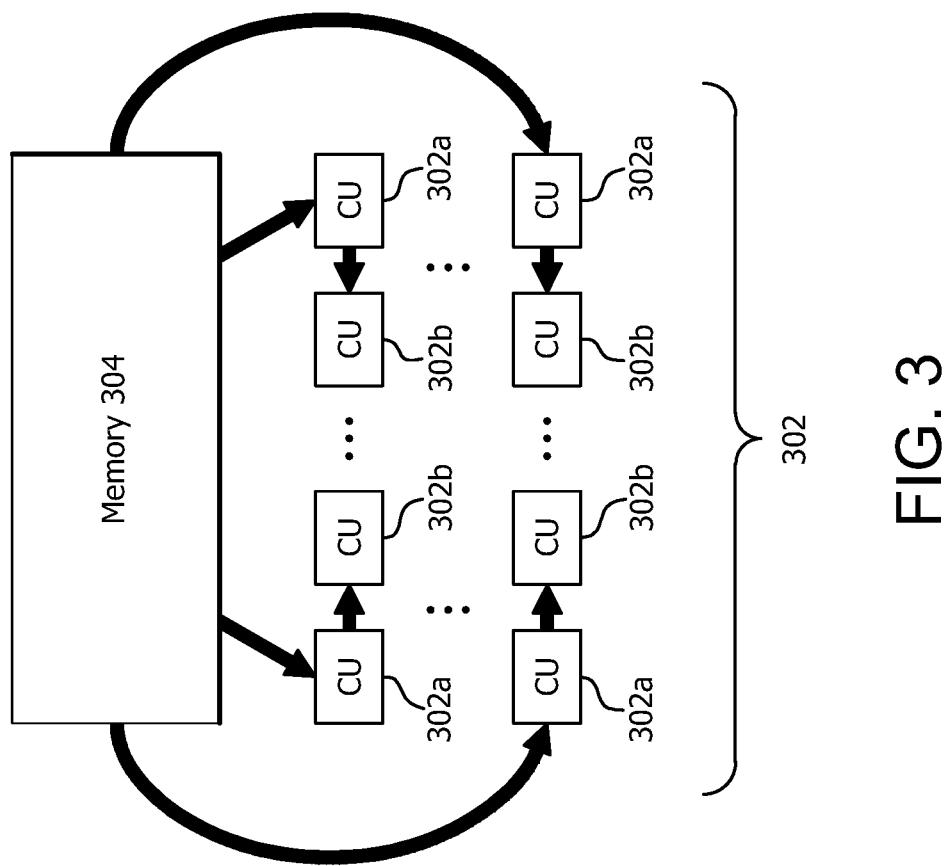
FIG. 3 is a block diagram illustrating a network of compute units (CUs) including CUs which receive data from memory and CUs which receive data from other CUs in the network.

FIG. 3 is a block diagram illustrating a CU network including CUs 302a which receive data from memory 304 and other CUs 302b which receive data from CUs 302a. That is, data initially received (e.g., read from memory) by CUs 302a can be communicated to CUs 302b in the next phase of a matrix multiplication computation. Using CUs (e.g., CUs 302a) to receive data via other CUs (e.g., CUs 302b) instead of directly from memory, as shown in the example at FIG. 3, relieves pressure on memory bandwidth.

Hierarchical CU networks employ the technique illustrated in FIG. 3. Some conventional matrix multiplication techniques which employ this technique however, exhibit load imbalance, causing some CUs to stall other CUs in the hierarchical network. In addition, these conventional techniques inefficiently use the underlying hierarchical CU networks to perform matrix multiplication operations.

Features of the present disclosure exploit characteristics of hierarchical CU networks, such as physical proximity between subsets of CUs in the hierarchical networks and asymmetric communication links in the networks, to perform matrix multiplications more efficiently than conventional matrix multiplication techniques. As described in more detail below, communication is localized to communication links between CUs which are physically closer to each other than other CUs. These communication links are, for example, configured to be physically wider and transmit data faster between the more closely located CUs than other communication links between CUs which are more distant from each other.

Figure 4:
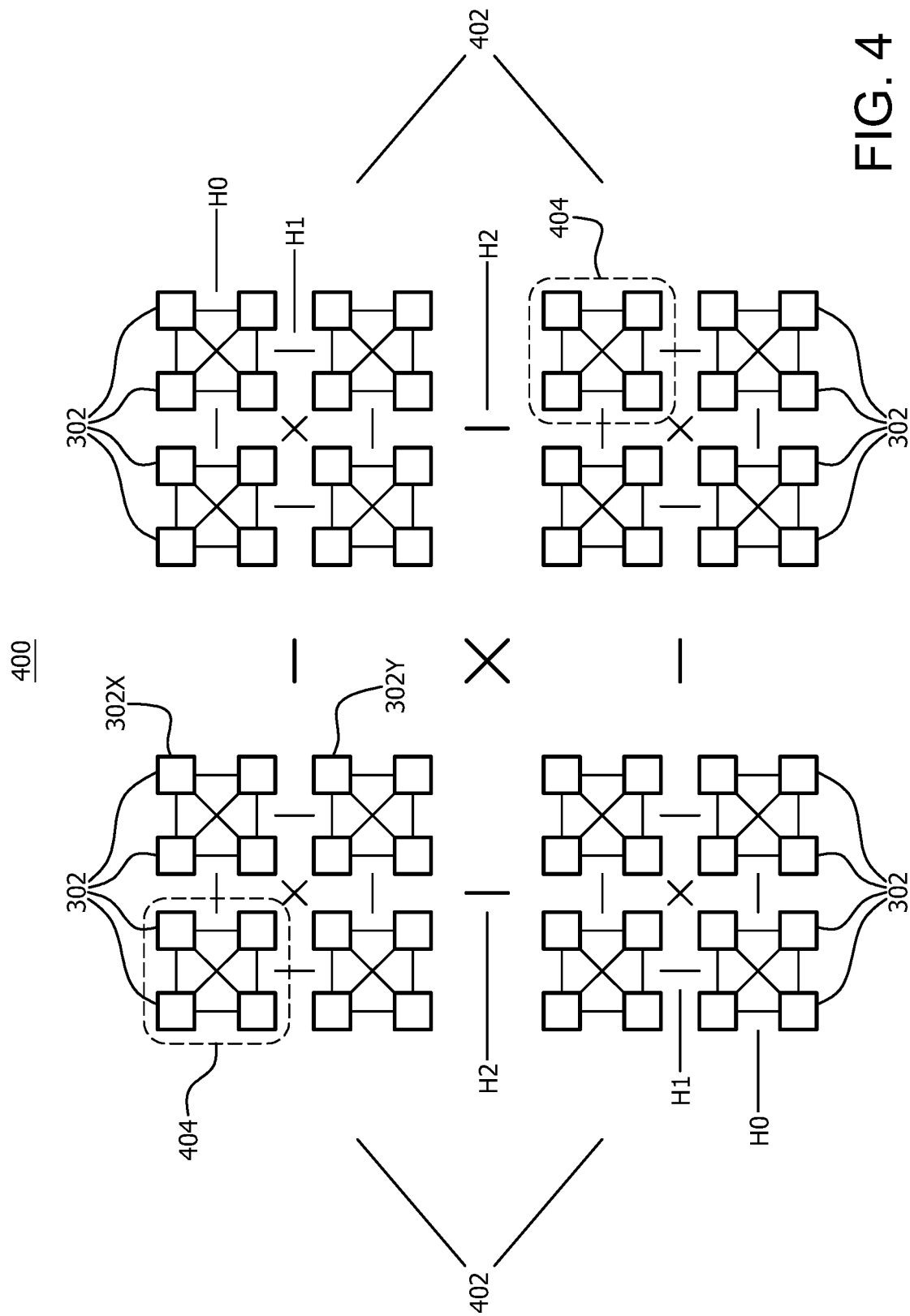
FIG. 4 is a diagram illustrating an example hierarchical network in which one or more features of the disclosure can be implemented.

FIG. 4 is a diagram illustrating an example hierarchical network 400 in which one or more features of the disclosure can be implemented. The network 400 includes 64 CUs 302 and three hierarchical levels each defined by different communication links H0, H1, and H2. As shown in FIG. 4, the network 400 includes 4 super CU clusters 402. Each super CU cluster 402 includes 4 super CUs 404. Each super CU 404 includes 4 CUs 302. Each CU 302 in a super CU 404 has a correspondingly located CU 302 in another super CU 404. For example, as shown in FIG. 4, CU 302X, which is located at row 1, column 2 of its super CU 404 includes a corresponding located CU 302Y, located at row 1, column 2 of its super CU 404. Likewise, the two remaining super CUs 404 in the super CU cluster 402 also have corresponding located CUs at row 1, column 2 of their super CUs 404.

Each super CU 404 includes communication links H0 (e.g., up, down, left, right and diagonal) for communicating data between CUs 302 of the super CU 404. Accordingly, CUs 302 within a super CU 404 communicate with each other on a first hierarchical level via communication links H0. Each super CU cluster 402 includes communication links H1 (e.g., up, down, left, right and diagonal) for communicating data between super CUs 404 of the super CU cluster 402. Accordingly, CUs 302 within one super CU 404 of a super CU cluster 402 communicate with CUs 302 within another super CU 404 of the super CU cluster 402 on a second hierarchical level via communication links H1. The network 400 also includes communication links H2 (e.g., up, down, left, right and diagonal) for communicating data between super CU cluster 402 of the network 400. Accordingly, CUs 302 within one super CU cluster 402 communicate with CUs 302 within another super CU cluster 402 on a third hierarchical level via communication links H2. The numbers of CUs, super CUs, super CU clusters and hierarchies shown in FIG. 4 are merely exemplary.

Because CUs 302 within a super CU 404 are closer, in physical proximity, to each other than CUs 302 of neighboring super CUs 404 and CUs 302 of neighboring super CU clusters 402, it is more efficient to pass data between the CUs 302 within a super CU 404 at the first hierarchical level via communication links H0 than passing data between the CUs 302 at the second hierarchical level via communication links H1 and the third hierarchical level via communication links H2.

For example, data is passed between the CUs 302 within a super CU 404 at the first hierarchical level via communication links H0 in less time (e.g., less latency) than data is passed between the CUs 302 at the second hierarchical level via communication links H1 and the third hierarchical level via communication links H2. In addition, increasing the physical size (e.g., width, or diameter cross section) of a link increases the bandwidth (i.e., amount of data transmitted in an amount of time) over the link, thereby decreasing the probability of a bottleneck occurring. Increasing the physical size of a link, however, also increases the amount of material of the link, thereby increasing the overall cost (e.g., cost of material, manufacturing cost) of the processing device. Because the lengths of the communication links H0 are less than the lengths of the communication links H1 and H2, it costs less to increase the widths along the lengths of links H0 than the width along the longer lengths of links H1 and H2. Therefore, it is more efficient to increase the widths of links H0 (i.e., increase the H0 bandwidth) relative to links H1 and links H2 and pass more data over the H0 links (i.e., localize communication).

Figure 5:
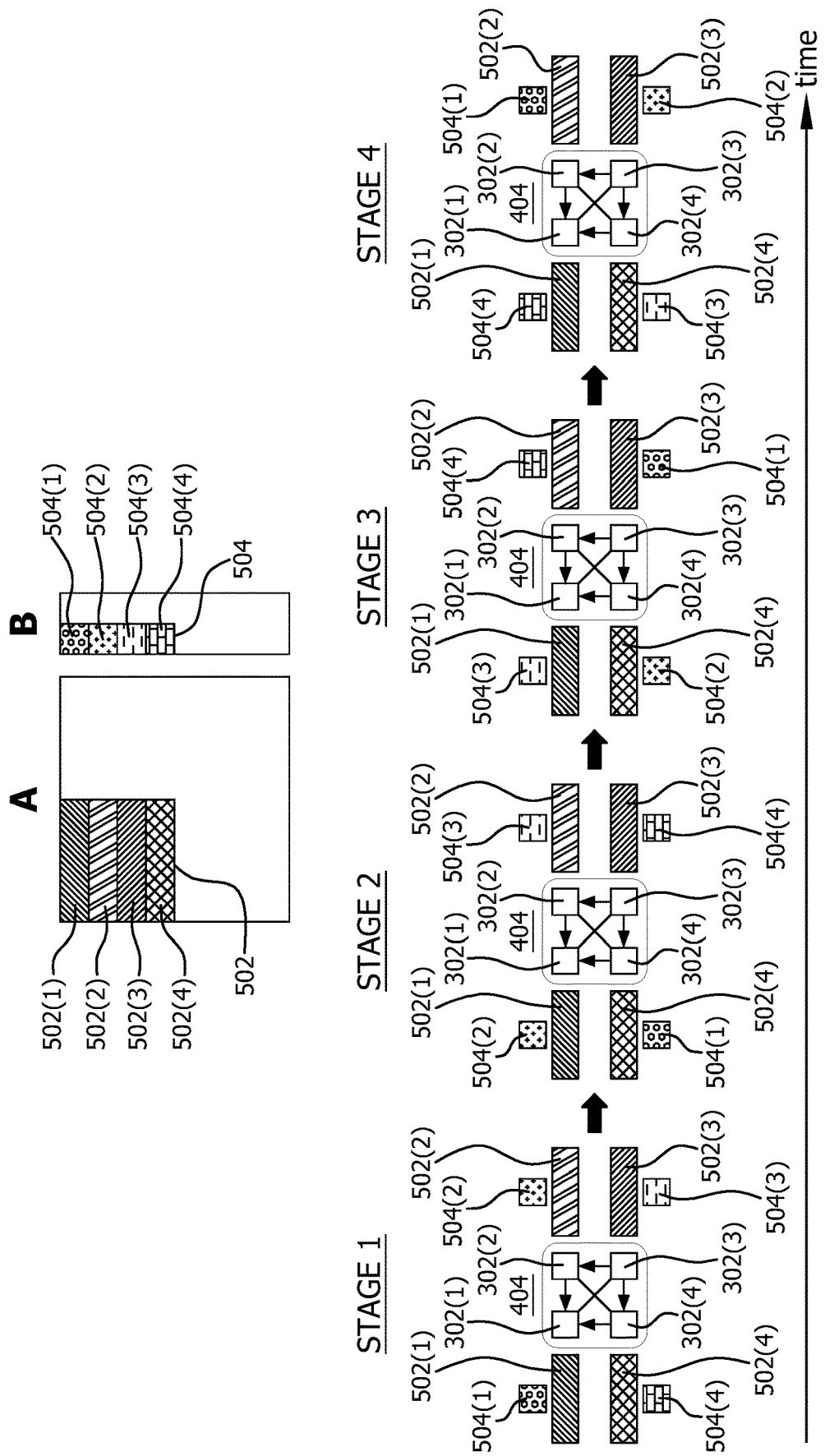
FIG. 5 is a diagram illustrating a matrix multiplication computation of two matrices according to features of the disclosure.

FIG. 5 is a diagram illustrating matrix multiplication of two matrices, matrix A and matrix B, according to features of the disclosure. A matrix multiplication operation includes the calculation $C=A \times B$, where A, B, C are matrices of sizes $M \times K$, $K \times N$, and $M \times N$, respectively. Each element in matrix C is a dot product of a row of matrix A and a column of matrix B.

Matrix A and matrix B are illustrated at the top of FIG. 5. In the example shown in FIG. 5, although the sizes of matrix A and matrix B are different from each other, matrix multiplication operation can be performed for matrices if the number of columns in matrix A is equal to the number of rows in matrix B. In the example shown in FIG. 5, matrix A includes eight columns and matrix B includes 8 rows. The number of columns and rows in matrices A and B are merely exemplary. Matrix multiplication is performed, according to features of the present disclosure, for matrices of any size meeting the general rules for matrix multiplication (e.g., number of columns in matrix A is equal to the number of rows in matrix B.

In the examples described herein, memory includes a memory portion (e.g., memory 104) shared by each of the processor cores (e.g., CUs 302) as well as memory segments (e.g., registers, cache memory or other data holding elements), separate from the shared memory 104 (e.g., main memory). Each CU 302 is associated with a memory segment (e.g., registers, cache memory or other data holding elements) separate from the shared memory 104, which are, for example, implemented within each CU 302. Each CU 302 accesses the data in its associated memory segment more efficiently than the data in the shared memory 104. The data, previously been read from the shared memory 104 and stored (e.g., loaded into registers), is communicated among the CUs 302 without re-accessing (e.g., re-reading) the data from memory 104, reducing demands on the shared memory 104.

For simplified explanation, FIG. 5 illustrates a part (i.e., partial computation) of a matrix multiplication operation (i.e., multiplication of matrix A and matrix B). That is, FIG. 5 illustrates a matrix multiplication computation of portion 502 of matrix A and portion 504 of matrix B. In the example shown in FIG. 5, portion 502 of matrix A includes 4 sub-portions 502(1)-502(4). In various alternatives, any of the sub-portions 502(1)-502(4) includes data from a single row or from more than one row.

Portion 504 of matrix B includes 4 sub-portions 504(1)-504(4). In various alternatives, any of the sub-portions 504(1)-504(4) includes data from a single column or from more than one column. Matrix multiplication computations are also performed, for example, by simultaneously multiplying multiple rows of matrices A and multiple columns of matrix B.

Matrix multiplication computations are also performed according to features of the present disclosure by, for example, using k-partitioning. If matrix A does not include sufficient rows (or block rows) for each CU 302, a single row is segmented and various segments of the row are distributed to multiple CUs 302 instead of assigning the row to a CU 302 and multiple CUs 302 compute the same output block in matrix C.

In the example shown in FIG. 5, the matrix multiplication computation is illustrated over 4 stages using one of the super CUs 404 of a super CU cluster 402 shown in FIG. 4. Examples of performing matrix multiplication according to features of the present disclosure also include using CU networks configured differently than network 400 in FIG. 4 (e.g., CU networks having different numbers of CUs, super CUs, CU clusters, and hierarchical levels than network 400 in FIG. 4).

Each CU 302 of the super-CU 404 reads from a memory portion (e.g., main memory) shared by each of the CUs 302 and stores (e.g., loads) a different sub-portion of matrix A into a memory segment (e.g., registers), which is separate from the memory portion shared by each of the CUs 302 and which is associated with the corresponding CU 302. For example, in stage 1, CU 302(1) stores sub-portion 502(1), CU 302(2) stores sub-portion 502(2), CU 302(3) stores sub-portion 502(3) and CU 302(4) stores sub-portion 502(4). Also, in stage 1, each CU 302 of the super-CU 404 reads from memory (e.g., memory 104) and stores (e.g., loads) a different sub-portion of matrix B into a memory segment (e.g., registers) separate from the memory and associated with the corresponding CU 302. For example, in stage 1, CU 302(1) stores sub-portion 504(1), CU 302(2) stores sub-portion 504(2), CU 302(3) stores sub-portion 504(3) and CU 302(4) stores sub-portion 504(4).

As shown in the remaining stages 2-4, the sub-portions 504(1)-504(4) of matrix B are communicated among the CUs 302 of the super CU 404 without accessing main memory while each sub-portion 502(1)-502(4) of matrix A remains in the associated memory segment (e.g., registers) to which it was previously stored by corresponding CUs 302 in stage 1. That is, at stages 2-4 of the partial computation, while each sub-portion 502(1)-502(4) of matrix A remains in the memory segment associated with corresponding CUs 302, each one of the sub-portions 504(1)-504(4) of matrix B is communicated among each of the CUs 302 until each CU 302 of the super CU 404 receives each sub-portion 504(1)-504(4).

For example, sub-portion 504(1) of matrix B, which is stored by CU 302(1) in stage 1, is communicated from CU 302(1) to CU 302(4). In stage 2, CU 302(4) receives the sub-portion 504(1) and determines a product (e.g., dot product) of the sub-portion 504(1) and sub-portion 502(4). Sub-portion 504(2) of matrix B, which is stored by CU 302(2) in stage 1, is communicated from CU 302(2) to CU 302(1). In stage 2, CU 302(1) receives sub-portion 504(2) and determines a product (e.g., dot product) of the sub-portion 504(2) and sub-portion 502(1). Sub-portion 504(3) of matrix B, which is stored by CU 302(3) in stage 1, is communicated from CU 302(3) to CU 302(2). In stage 2, CU 302(2) receives sub-portion 504(3) and determines a product (e.g., dot product) of the sub-portion 504(3) and sub-portion 502(2). Sub-portion 504(4) of matrix B, which is stored by CU 302(4) in stage 1, is communicated from CU 302(4) to CU 302(3). In stage 2, CU 302(3) receives sub-portion 504(4) and determines a product (e.g., dot product) of the sub-portion 504(4) and sub-portion 502(3). As shown in stage 2, however, each sub-portion 502(1)-502(4) of matrix A is not communicated between CUs 302. That is, each sub-portion 502(1)-502(4) of matrix A remains in the same memory segment (e.g., registers) to which it was previously stored by a corresponding CU 302 in stage 1.

As shown in stages 3 and 4 of FIG. 5, communication of the sub-portions 504(1)-504(4) of matrix B between CUs 302 is rotated in a counter clockwise direction, until each CU 302 of the super CU 404 has received each sub-portion 504(1)-504(4). The counter clockwise direction of the communication of the sub-portions 504(1)-504(4) shown in FIG. 5 is merely an example. Examples also include passing the sub-portions 504(1)-504(4) between stages in a clockwise direction and passing the sub-the portions 504(1)-504(4) between stages in a diagonal direction.

Because each sub-portion 502(1), 502(2), 502(3) and 502(4) of matrix A is stored (e.g., from memory to registers) a single time in stage 1 and reused by each CU 302 in stages 2-4, less data is communicated along the H0 communication links interconnecting the CUs 302 than would otherwise be communicated if each sub-portion 502(1), 502(2), 502(3) and 502(4) of matrix A was also communicated between CUs 302 at stages 2-4, thereby reducing the pressure on interconnect bandwidth.

In the example described using FIG. 5, the matrix multiplication operation is divided into 8 partial computations based on the size of matrices A and B and based on four available CUs 302 in each super CU 404. FIG. 5 illustrates one of the eight partial computations of this matrix multiplication operation example. In the partial computation shown at FIG. 5, portions 502 (which is a portion of row 1 of matrix A) and 504 (which is a portion of column 1 of matrix B) are each divided into four sub-portions based on 4 available CUs 302 in each super CU 404. The number of sub-portions shown in FIG. 5 is merely an example. Matrix multiplication is performed according to features described herein, however, by dividing the matrices in various ways based on available CUs and matrix size.

The matrix multiplication operation is completed when the data in each row of matrix A interacts with the data in two columns of matrix B (i.e., the data in row 1 of matrix A interacts with the data in column 1 and column 2 of matrix B and the data in row 2 of matrix A interacts with the data in column 1 and column 2 of matrix B). For example, one of the 7 remaining partial computations (not shown) includes the interaction of the first half of the first row of matrix A with the first half of column 2 of matrix B. The remaining partial computations are performed in the same manner as the partial computation of portions 502 and 504 shown in FIG. 5 to complete the matrix multiplication operation. That is, each of the remaining partial computations is performed over 4 stages using a super CU 404 shown in FIG. 4. For example, a different one of the 3 remaining super CUs 404 of a super SU cluster 402 shown in FIG. 4. For example, the remaining partial computations are performed, in parallel, over 4 stages using a different one of the super CUs 404 shown in FIG. 4.

In the example shown at FIG. 5, matrix multiplication is performed with portions of matrix A remaining stationary while communally storing portions of matrix A between CUs 302 within a super-CU 404. Alternatively, matrix multiplication is performed with portions of matrix B remaining stationary while communally storing portions of matrix A between CUs 302.

FIG. 6 is a flow diagram illustrating an exemplary matrix multiplication method 600 according to features of the disclosure. As shown at block 602, the method 600 includes receiving (e.g., reading from memory), at a first processor core (e.g., any one of CUs 302(1)-302(4) shown in FIG. 5), a sub-portion of a first matrix and a sub-portion of a second matrix. For example, each of the CUs 302(1)-302(4) shown at stage 1 in FIG. 5 receive one of the sub-portions 502(1)-502(4) of matrix A and one of the sub-portions 504(1)-504(4) of matrix B. That is, each of the sub-portions 502(1)-502(4) of matrix A and each of the sub-portions 504(1)-504(4) are, for example, read from main memory and are not received from another CU 302. For example, sub-portion 502(1) of matrix A and sub-portion 504(1) of matrix B are initially read from main memory, by CU 302(1), and stored (e.g., loaded) to the memory segment (e.g., registers) associated with CU 302(1).

As shown at block 604, the method 600 includes storing first and second matrix sub-portions. For example, the sub-portion 502(1) of matrix A and the sub-portion 504(1) of matrix B is stored in memory at stage 1. A product (e.g., dot product) is then determined from the data in the first and second matrix sub-portions, as shown in block 606. For example, the first CU 302(1) determines the product from the data in sub-portion 502(1) and the sub-portion 504(1).

The second matrix sub-portion is then communicated to a second core while the first matrix sub-portion is maintained in memory, as shown at block 608 of the method 600. For example, as shown at stages 1 and 2 in FIG. 5, the second matrix sub-portion 504(2) used by CU 302(2) in stage 1 is provided to CU 302(1) where sub-portion 504(2) is used by CU 302(2) in stage 2 while the first matrix sub-portion 502(1) is maintained in the memory segment (e.g., registers) associated with CU 302(1).

At decision block 610, it is determined (e.g., by a CU) whether a new second matrix sub-portion is received from another processor core (i.e., communicated from another CU 302). When it is determined, at decision block 610 that a new second matrix sub-portion is received, the product is determined (e.g., by the receiving CU) from the data in the first matrix sub-portion and the data in the new second matrix sub-portion. For example, CU 302(1) determines that new second matrix sub-portion 504(2), which is communicated to CU 302(1) from 302(2)) is received in stage 2 of FIG. 5. As further shown in stage 2, the first matrix sub-portion 502(1) used by CU 302(1) in stage 2 is the same as the first matrix 502(1) used by CU 302(1) in stage 1 (and likewise is the same as the first matrix 502(1) used by CU 302(1) in stages 3 and 4). That is, the first matrix sub-portion 502(1) is again maintained in in the memory segment (e.g., registers) associated with CU 302(1).

When it is determined, at decision block 610, that a new second matrix sub-portion is not received (e.g., each second matrix sub-portion 504(1)-504(4) has been received by a CU 302 and used to determine the products), the part of the matrix multiplication operation ends at 612. For example, after each of the 4 stages shown in FIG. 5 are completed, each CU 302(1)-302(4) determines that a new second matrix sub-portion is not received and the part of the matrix multiplication operation ends.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processing device comprising:
   memory; and
   a plurality of processor cores in communication with each other via first hierarchical communication links and second hierarchical communication links, each processor core in a group of the plurality of processor cores being in communication with each other via the first hierarchical communication links and configured to:
   determine a product of one sub-portion of data of a plurality of sub-portions of data of a first matrix in the memory and one sub-portion of data of a plurality of sub-portions of data of a second matrix in the memory;
   receive, from another processor core of the group of the plurality of processor cores, another sub-portion of data of the plurality of sub-portions of data of the second matrix while the one sub-portion of data of the first matrix remains in the memory; and
   determine a product of the one sub-portion of data of the first matrix and the another sub-portion of data of the second matrix.

2. The processing device according to claim 1, wherein each processor core of the group of the plurality of processor cores is further configured to receive the another sub-portion of data of the second matrix from the another processor core without accessing the memory.

3. The processing device according to claim 1, wherein
   the group of the plurality of processor cores is one first hierarchical group of processor cores of a plurality of first hierarchical groups of processor cores; and
   the plurality of processor cores comprises a second hierarchical group of processor cores comprising the plurality of first hierarchical groups of processor cores, the first hierarchical groups of processor cores being in communication with each other via the second hierarchical communication links, each one of the first hierarchical communication links extends a first distance, each one of the second hierarchical communication links extends a second distance and the first distance is less than the second distance, and the another sub-portion of data of the second matrix is received from the another processor core via one of the first hierarchical communication links.

4. The processing device according to claim 3, wherein each processor core of the first hierarchical group of processor cores is further configured to determine dot products for the one sub-portion of data of the first matrix and each remaining sub-portion of data of the second matrix by receiving each remaining sub-portion of data of the second matrix from another processor core of the group of the plurality of processor cores while the one sub-portion of data of the first matrix remains in the memory.

5. The processing device according to claim 1, wherein the sub-portions of data of the first matrix are sub-portions of a row of the first matrix, and the sub-portions of data of the second matrix are sub-portions of a column of the second matrix.

6. The processing device according to claim 1, wherein each processor core in the group of the plurality of processor cores is further configured to communicate the another sub-portion of data of the second matrix to another one of the processor cores.

7. The processing device according to claim 1, wherein each of the plurality of processor cores is a compute unit comprising one or more single instruction, multiple data (SIMD) units.

8. A processing device comprising:
memory; and
a plurality of processor cores in communication with each other via first hierarchical communication links, the plurality of processor cores comprising a first processor core and a second processor core, wherein
the first processor core is configured to:
determine a product of a first sub-portion of data of a first matrix in the memory and a first sub-portion of data of a second matrix in the memory; and
communicate, to the second processor core via one of the first hierarchical communication links, the first sub-portion of data of the second matrix while the first sub-portion of data of the first matrix remains in the memory; and
the second processor core is configured to:
receive the first sub-portion of data of the second matrix communicated by the first processor core while the first sub-portion of data of the first matrix remains in the memory; and
determine a product of the first sub-portion of data of the second matrix received from the first processor core and a second sub-portion of data of the first matrix.

9. The processing device according to claim 8, wherein the first processor core is configured to determine the product and communicate the first sub-portion of data of the second matrix at a first stage; and
the second processor core is configured to receive the first sub-portion of data of the second matrix and determine the product at a second stage after the first stage.

10. The processing device according to claim 8, wherein the first processor core is further configured to:

communicate the first sub-portion of data of the second matrix to the second processor core while the first sub-portion of data of the first matrix remains in the memory; and the second processor core is further configured to communicate, to a third processor core via one of the first hierarchical communication links, the first sub-portion of data of the second matrix while the second sub-portion of data of the first matrix remains in the memory.

11. The processing device according to claim 8, wherein each of the plurality of processor cores is a compute unit comprising one or more single instruction, multiple data (SIMD) units.

12. The processing device according to claim 8, wherein the plurality of processor cores is one of a plurality of first hierarchical groups of processor cores, each processor core of a first hierarchical group being in communication with each other via a plurality of the first hierarchical communication links; and the processing device further comprises a second hierarchical group of processor cores comprising the first hierarchical groups of processor cores, the first hierarchical groups being in communication with each other via a plurality of second hierarchical communication links, wherein each one of the first hierarchical communication links extends a first distance, each one of the second hierarchical communication links extends a second distance and the first distance is less than the second distance, and the first sub-portion of data of the second matrix is provided to the second processor core via one of the first hierarchical communication links.

13. The processing device according to claim 8, wherein the first processor core is configured to receive remaining sub-portions of data of the second matrix from other processor cores of the plurality of processor cores and determine dot products for the remaining sub-portions of data of the second matrix and the first sub-portion of data of the first matrix while the first sub-portion of data of the first matrix remains in the memory, and the second processor core is configured to receive the remaining sub-portions of data of the second matrix from the another processor cores of the plurality of processor cores and determine dot products for the remaining sub-portions of data of the second matrix and the second sub-portion of data of the first matrix while the second sub-portion of data of the first matrix remains in the memory.

14. The processing device according to claim 8, wherein the first sub-portion of data of the first matrix is a sub-portion of a row of the first matrix; and
the first sub-portion of data of the second matrix is a sub-portion of a column of the second matrix.

15. A method for use in a processing device having a plurality of processor cores for performing matrix multiplication, the method comprising:
determining, by a first processor core, a product of a first sub-portion of data of a first matrix in memory and a first sub-portion of data of a second matrix in the memory;
communicating, by the first processor core to a second processor core, the first sub-portion of data of the second matrix via one of a plurality of first hierarchical communication links while the first sub-portion of data of the first matrix remains in the memory;

and determining, by the second processor core, a product of a second sub-portion of data of the first matrix in the memory and the first sub-portion of data of the second matrix in the memory.

16. The method according to claim 15, further comprising communicating, by the first processor core, the first sub-portion of data of the second matrix to the second processor core without accessing the memory.

17. The method according to claim 15, further comprising communicating, by the second processor core, the first sub-portion of data of the second matrix to a third processor core.

18. The method according to claim 15, further comprising:

determining, by the first processor core, dot products for the first sub-portion of data of the first matrix and remaining sub-portions of data of the second matrix by receiving each remaining sub-portion of data of the second matrix from other processor cores via the plurality of first hierarchical communication links while the first sub-portion of data of the first matrix remains in the memory, and determining, by the second processor core, dot products for the second sub-portion of data of the first matrix and the remaining sub-portions of data of the second matrix by receiving each remaining sub-portion of data of the second matrix from other processor cores via the plurality of first hierarchical communication links while the second sub-portion of data of the first matrix remains in the memory.

19. The method according to claim 15, wherein the first sub-portion of data of the first matrix is a sub-portion of a row of the first matrix, and the first sub-portion of data of the second matrix is a sub-portion of a column of the second matrix.

20. The method according to claim 15, wherein the first processor core and the second processor core are cores of a first group of processor cores, the processor cores of the first group of processor cores being in communication with each other via the plurality of first hierarchical communication links; and the first group of processor cores is in communication with a second group of processor cores via one of a plurality of second hierarchical communication links, wherein each one of the first hierarchical communication links extends a first distance, each one of the second hierarchical communication links extends a second distance and the first distance is less than the second distance.

* * * * *